Nov. 11, 1952   G. E. STEURER   2,617,239
BELT SANDER
Filed Sept. 14, 1949   2 SHEETS—SHEET 1
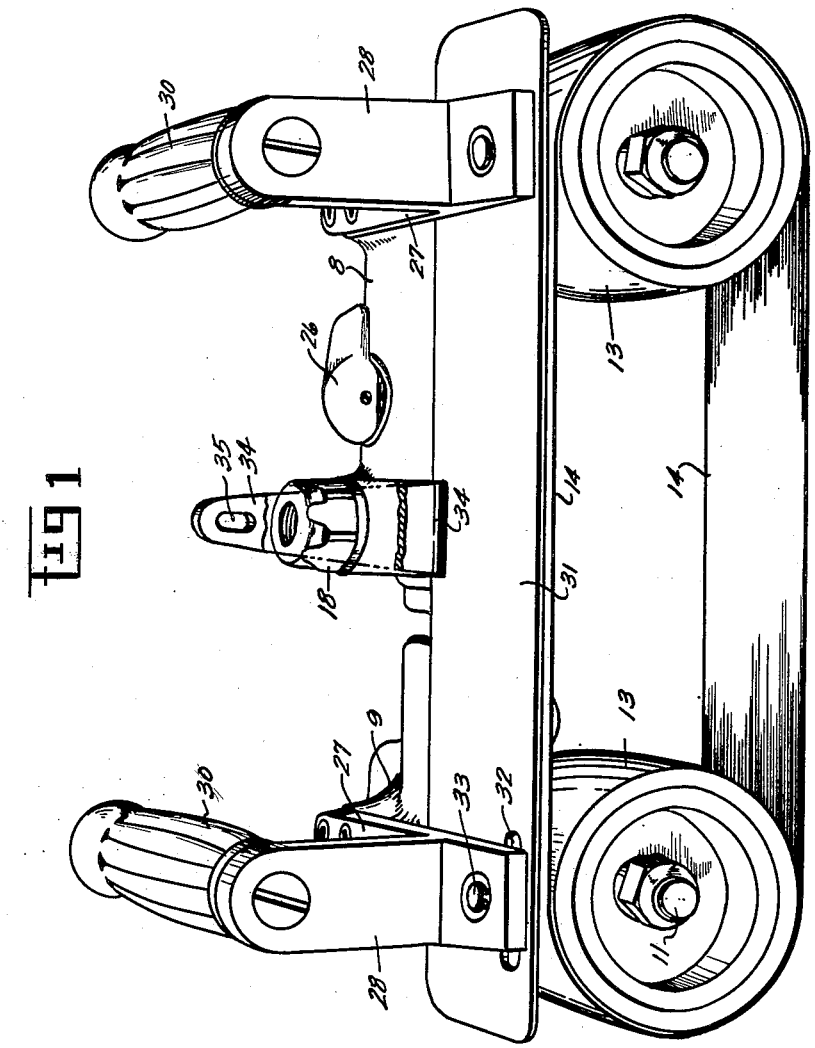
INVENTOR.
GEORGE E. STEUER
BY
ATTORNEY

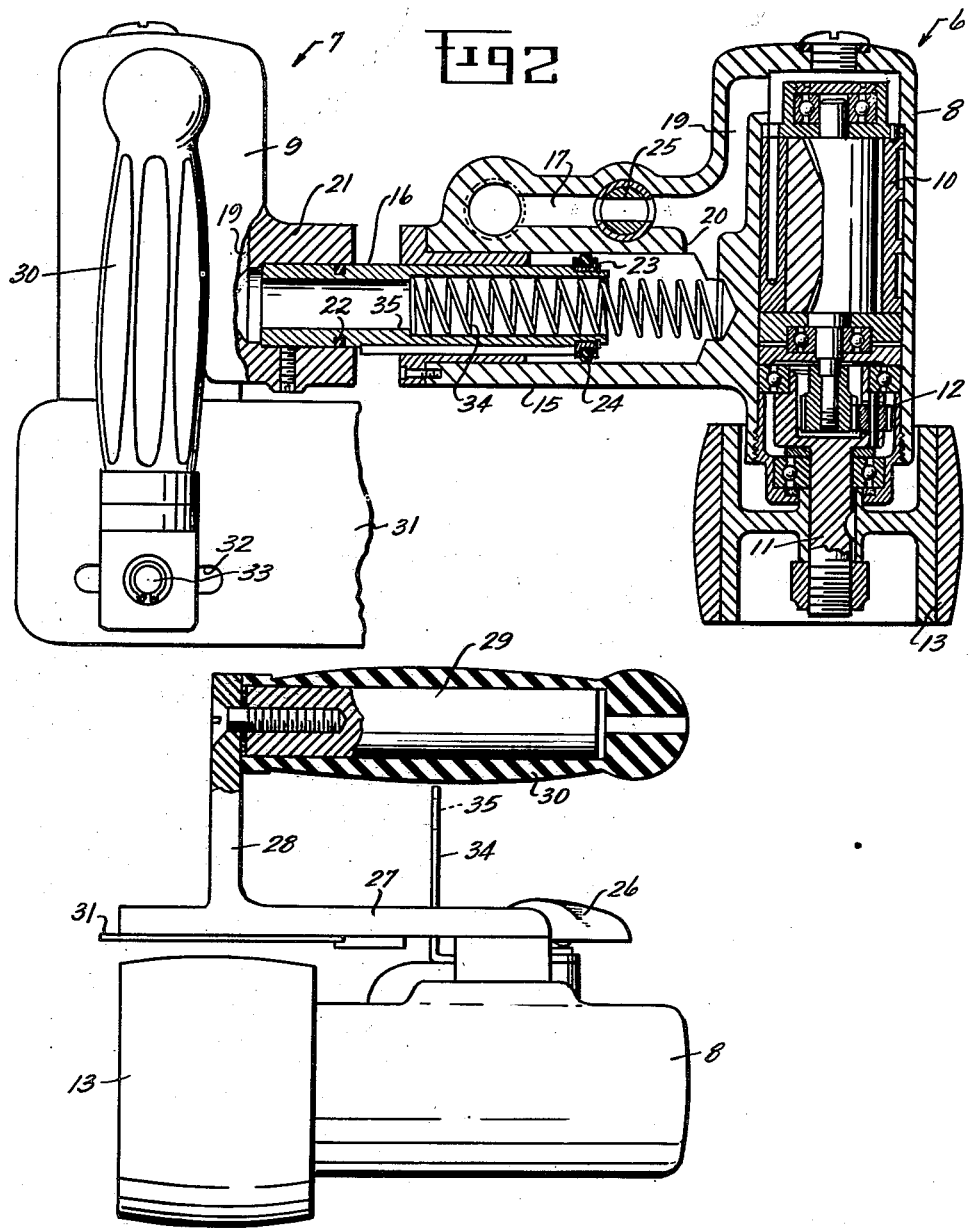

Patented Nov. 11, 1952

2,617,239

UNITED STATES PATENT OFFICE 2,617,239

BELT SANDER

George E. Steurer, Dayton, Ohio, assignor to Buckeye Tools Corporation, Dayton, Ohio, a corporation of Ohio Application September 14, 1949, Serial No. 115,695

3 Claims. (Cl. 51—170)

This invention relates to a portable belt sander.

One object of the invention is to provide a belt sander of simple construction, of light weight and having improved means for yieldably retaining the pulleys in belt tightening position.

A further object of the invention is to provide a belt sander in which two pulley supporting units are slidably connected one with the other and are urged in belt tightening direction by fluid pressure.

A further object of the invention is to provide a belt sander in which the two pulley supporting units are connected one with the other by a fluid extensible device through which a fluid inlet is connected with one of the motors.

A further object of the invention is to provide a belt sander in which means are provided for maintaining sufficient pressure on the pulleys to retain the belt thereon when the fluid pressure is interrupted.

Other objects of the invention may appear as the device is described in detail.

In the accompanying drawings Fig. 1 is a perspective view of a belt sander embodying the invention; Fig. 2 is a top plan view of the same, partly in section; and Fig. 3 is an elevational view of the sander partly in section.

In these drawings there is illustrated one embodiment of the invention showing the same as applied to a belt sander, but it is to be understood that the device as a whole, as well as the several parts thereof, may take various forms and may be used for various purposes without departing from the spirit of the invention.

The sander comprises two units, 6 and 7, slidably connected one with the other, one or both of the units including a motor and a belt pulley driven by the motor. Interposed between the two units is a fluid operated device for imparting relative movement to the units in a direction to maintain the belt taut on the pulleys while the sander is in operation, and when the motor or motors are of the fluid operated type, means are provided for simultaneously supplying fluid under pressure to the tightening device and to the motor or motors.

In that embodiment of the invention here illustrated, each unit includes a housing, 8 and 9, in each of which there is mounted a fluid operated motor 10, one motor only being shown. A shaft 11 is connected with and driven by each motor, as by suitable gearing 12. Mounted on each shaft, beyond the end of the housing, is a belt supporting pulley 13, and a belt 14, having an abrasive outer surface, is mounted on the two pulleys. The two housings are slidably connected one with the other by telescoping elements 15 and 16, and preferably both elements are tubular in form. The outer telescoping element 15 is rigidly connected with one of the housings, in the present instance the housing 8, and is preferably formed integral therewith. A fluid supply passage 17 is formed in the outer element 15 and is provided at its intake end with means, such as a fitting 18, whereby it may be connected with a suitable source of fluid under pressure, as by a flexible conduit. The inner end of the fluid passage 17 is connected with the motor 10 of the housing 8, preferably by a passage 19 formed in the wall of the housing, and a second passage 20 connects the inner end portion of the fluid passage with the inner end of the tubular element 15. The second tubular element 16 is connected with housing 9, and, in the present instance, the outer end thereof is mounted in and rigidly secured to a tubular boss 21 on the housing 9, the inner end of which communicates with the motor in the housing 9, preferably by a passage similar to passage 19 in the housing 8. The connection between the tubular element 16 and the bushing 21 is sealed as by a circumferential sealing element 22. The tubular element 16 is slidably mounted in the tubular element 15 and is provided adjacent its inner end with a part forming a piston. In the arrangement shown this piston comprises an annular member 23 mounted on a reduced inner portion of the tubular element 16 and having mounted thereon a yieldable element 24, such as a ring of soft rubber, to provide a fluid tight connection between the same and the inner wall of the tubular element 15. Thus a portion of the fluid entering through the passage 17 will be delivered through the passage 19 to the motor 10 in the housing 8, and another portion of said fluid will be delivered through the tubular elements to the motor in housing 9. This last mentioned portion of the fluid will also act on the piston 23—24 to move the housings and the pulleys carried thereby one from the other in a direction to extend the pulleys and maintain the belt thereon in a taut operative condition. The supply of fluid to the motors and to the extensible device may be controlled in any suitable manner and in the present arrangement a turn plug valve 25 is mounted in the passage 17 and is provided exteriorly thereof with a finger piece 26 by which it may be actuated.

The two units are provided with handles by which they may be supported and manipulated. These handles may be connected with the housings in any suitable manner and as here shown brackets 27 are rigidly secured to the respective housings and are provided with upwardly extending parts 28 to which are secured handle members 29 which extend above and lengthwise of the respective housings. Preferably each member 29 is provided with a covering 30 of soft rubber, or other suitable material to form a firm hand grip. The valve actuating device 26 is arranged adjacent the housing 8 in such a position that it may be engaged and actuated by a finger of the hand which grasps the handle on that housing.

The base portion of each bracket 27 extends outwardly above the adjacent pulley and secured to the outwardly extending portions of the brackets is a guard plate 31 which is supported above and adjacent to the upper stretch of the belt for engagement by loosened abrasive material which may fly from the rapidly moving belt, thus preventing such loose material from being thrown in the face of or against the hands of the operator. To permit the movement of the pulleys to and from their extended positions the guard plate is connected with one of the brackets by a slidable connection comprising a slot 32 in the plate and a bolt 33 extending through the outer portion of the bracket and the slot in the plate.

To prevent movement of the pulleys one toward the other sufficient to loosen the belt and permit the same to move off the pulleys when the supply of fluid under pressure has been interrupted, there is interposed between the housings a supplemental pressure device, such as a spring, of a strength sufficient to prevent the contraction of the pulleys due to the weight of the belt. In the construction shown, a coil spring 34 is mounted within the tubular element 15 and one end portion of the spring extends into the tubular element 16 and engages an inner shoulder 35 on the tubular element 16, the other end of the spring engaging the end wall of tubular element 15. The spring is thus confined between the two tubular elements and resists the movement of the housings toward each other.

A suspension device is shown at 34 by which the sander may, if desired, be connected with a cable leading to a counterbalancing weight, not shown. In the form shown, the device comprises an angular bar one end of which is secured to the member 15, as by the nut which forms a part of the hose connection 18. The other end of the bar is provided with an opening to receive the cable.

While I have shown and described one embodiment of my invention, I wish it to be understood that I do not desire to be limited to the details thereof as various modifications may occur to a person skilled in the art.

Having fully described my invention, what I claim as new and desire to secure by Letters Patent, is:

1. In a device of the character described, two laterally spaced units each including a housing, a fluid motor in said housing and a belt supporting pulley driven by said motor, one of said housings having a laterally extending element provided with a longitudinal bore in open communication with the fluid inlet of the motor in said housing, a tubular member rigid with the other of said housings, slidably mounted in the bore of the first mentioned element and connecting the interior of said bore with the fluid inlet of the motor in the last mentioned housing, a piston extending about said tubular element within said bore and engaging the wall of the latter in spaced relation to the inner end of said bore to form a fluid chamber, the laterally extending element of the first mentioned housing also having a fluid supply passage adapted to be connected with a source of fluid under pressure and leading to the fluid chamber in said bore and said fluid inlet of the motor in the first mentioned housing to simultaneously energize said motors and exert fluid pressure on the piston in said bore in a direction to move said units one from the other and maintain the belt thereon taut, and means for controlling the flow of fluid through said supply passage.

2. In a device of the character described, two laterally spaced units each including a housing, a fluid motor in said housing and a belt supporting pulley driven by said motor, one of said housings having a laterally extending element provided with a longitudinal bore in open communication with the fluid inlet of the motor in said housing, a tubular member rigid with the other of said housings, slidably mounted in the bore of the first mentioned element and connecting the interior of said bore with the fluid inlet of the motor in the last mentioned housing, a piston extending about said tubular element within said bore and engaging the wall of the latter in spaced relation to the inner end of said bore to form a fluid chamber, the laterally extending element of the first mentioned housing also having a fluid supply passage adapted to be connected with a source of fluid under pressure and leading to the fluid chamber in said bore and said fluid inlet of the motor in the first mentioned housing to simultaneously energize said motors and exert fluid pressure on the piston in said bore in a direction to move said units one from the other and maintain the belt thereon taut, means for controlling the flow of fluid through said supply passage, and a spring supported in the bore of the first mentioned element and confined between said tubular element and a fixed part of said first mentioned element to exert pressure on said housings in opposite directions and maintain said belt taut when the supply of fluid to said motors has been interrupted.

3. In a device of the character described, two laterally spaced units each including a housing, a shaft and a belt supporting pulley on said shaft, at least one of said units including a fluid motor mounted in its said housing and drivingly connected with said shaft, said housing having rigid therewith a laterally extending element having a longitudinal bore, an elongate element rigid with the other of said housings, extending into and slidably mounted in the bore of the first mentioned element and having within said bore a piston opposed to and spaced from the inner end of said bore to form a fluid chamber, said first mentioned element also having therein a fluid supply passage adapted to be connected with a source of fluid under pressure and having its inner end portion in open communication with the fluid inlet of said motor and with said fluid chamber in said bore to simultaneously supply fluid under pressure to said motor and to the fluid chamber in said bore, to actuate said motor and exert pressure on said housings in opposite directions and move said pulleys one from the other to maintain the belt thereon taut. and a single device for controlling the flow of fluid through said supply passage to said motor and said fluid chamber.

GEORGE E. STEURER.

REFERENCES CITED

The following references are of record in the file of this patent:

UNITED STATES PATENTS

| Number | Name | Date |
|---|---|---|
| 2,016,725 | Price et al. | Oct. 8, 1935 |
| 2,070,257 | Coates | Feb. 9, 1937 |
| 2,279,783 | Fowler | Apr. 14, 1942 |
| 2,416,493 | Newton | Feb. 25, 1947 |
| 2,479,536 | Elmes | Aug. 16, 1949 |